(12) United States Patent
Loudot et al.

(10) Patent No.: US 9,035,608 B2
(45) Date of Patent: May 19, 2015

(54) ELECTRIC MOTOR ASSEMBLY RECHARGEABLE FROM AN ELECTRICAL MAINS SYSTEM, AND DEDICATED CONNECTION HOUSING

(75) Inventors: Serge Loudot, Villiers le Bacle (FR); Benoit Briane, Guyancourt (FR); Olivier Ploix, Villiers St. Frederic (FR)

(73) Assignee: RENAULT S.A.S., Boulogne Billancourt (FR)

( * ) Notice: Subject to any disclaimer, the term of this patent is extended or adjusted under 35 U.S.C. 154(b) by 801 days.

(21) Appl. No.: 13/377,366

(22) PCT Filed: Jun. 9, 2010

(86) PCT No.: PCT/EP2010/058106
§ 371 (c)(1),
(2), (4) Date: Apr. 3, 2012

(87) PCT Pub. No.: WO2010/142738
PCT Pub. Date: Dec. 16, 2010

(65) Prior Publication Data
US 2012/0181975 A1    Jul. 19, 2012

(30) Foreign Application Priority Data
Jun. 9, 2009 (FR) ..................... 09 53817

(51) Int. Cl.
*H02J 7/00* (2006.01)
*H02J 7/14* (2006.01)
*H02H 7/18* (2006.01)
*B60L 11/18* (2006.01)

(52) U.S. Cl.
CPC ......... *B60L 11/1811* (2013.01); *B60L 11/1814* (2013.01); *Y02T 10/7005* (2013.01); *Y02T 10/7088* (2013.01); *Y02T 90/127* (2013.01); *Y02T 90/14* (2013.01)

(58) Field of Classification Search
CPC ................... B60L 11/1811; B60L 11/1814
USPC .............. 320/104, 123, 138; 307/10.1, 18; 701/22; 180/65.1, 65.285, 65.29, 180/65.31; 903/903, 906, 907
See application file for complete search history.

(56) References Cited

U.S. PATENT DOCUMENTS 5,341,075 A * 8/1994 Cocconi ................. 318/139
5,504,414 A * 4/1996 Kinoshita .............. 180/65.8

(Continued)

FOREIGN PATENT DOCUMENTS

| EP | 0 553 824 | 8/1993 |
|----|-----------|--------|
| FR | 2 738 411 | 3/1997 |
| FR | 2 847 523 | 5/2004 |

OTHER PUBLICATIONS

International Search Report Issued Mar. 14, 2011 in PCT/EP10/58106 Filed Jun. 9, 2010.

*Primary Examiner* — Richard V Muralidar
(74) *Attorney, Agent, or Firm* — Oblon, McClelland, Maier & Neustadt, L.L.P.

(57) ABSTRACT

An electric motor assembly includes a multi-phase electric motor, a battery of accumulators, an inverter configured to convert the direct current of the battery into multi-phase alternating current adapted to supply the motor, and a connection housing. The connection housing includes plugs allowing connection of motor phases, the battery terminals, and at least five connections to the inverter. The housing further includes a group of contacts allowing it to be connected to a single phase mains system, and a group of contacts allowing it to be connected a multi-phase mains system. The housing includes switches according to the position of which the system including the housing, the battery, the inverter, and the motor connected solely by its phases, alternatively allows the motor to be supplied from the battery, the battery to be recharged directly from a single-phase mains system, and the battery to be recharged from multi-phase mains system.

12 Claims, 5 Drawing Sheets

(56) References Cited

U.S. PATENT DOCUMENTS

| | | |
|---|---|---|
| 7,332,882 B2 * | 2/2008 | Aoyagi et al. ............... 318/139 |
| 8,421,381 B2 * | 4/2013 | Fukatsu ....................... 318/139 |
| 8,803,469 B2 * | 8/2014 | Briane et al. ................. 320/104 |
| 2006/0132085 A1 | 6/2006 | Loubeyre |
| 2009/0153097 A1 * | 6/2009 | Song et al. ................... 320/107 |

* cited by examiner

ELECTRIC MOTOR ASSEMBLY RECHARGEABLE FROM AN ELECTRICAL MAINS SYSTEM, AND DEDICATED CONNECTION HOUSING

CROSS REFERENCE TO RELATED APPLICATIONS

This application is a national stage entry of PCT/EP10/58106 filed Jun. 9, 2010 and claims priority from 0953817, France. The descriptions of the patent application are all incorporated herein by reference.

FIELD OF THE INVENTION

The invention relates to the charging of a battery of accumulators or an accumulator of an electrically driven automobile vehicle and, more particularly, a charging device, integrated into the vehicle, allowing the battery to be recharged directly from a single-phase or three-phase mains supply system. The electrical power supply battery will be referred to here by the generic term "battery", regardless of whether it comprises one or more electrical accumulators.

BACKGROUND OF THE INVENTION

One of the major disadvantages of the electric vehicle relates to its availability. In fact, when its battery is discharged, the electric vehicle remains unavailable for the entire recharging period, which may last several hours.

In order to reduce the battery recharging period, it is known for the charging power to be increased by increasing the current drawn from the mains system. It has thus been proposed to draw this current from a three-phase mains system rather than a single-phase mains system, the charging power being greater when the current is drawn from a three-phase mains supply system. Conversely, for recharging at the user's home, a device enabling recharging from a single-phase mains system (for example from a 32 A domestic socket) offers a practical alternative. A device allowing the user to recharge the battery of his vehicle either from a single-phase mains system or from a three-phased mains system would therefore allow the availability of the vehicle to be improved.

The constraints of electromagnetic compatibility of the recharging system with the electrical mains supply used, and also the constraints inherent in the battery recharging conditions require the intermediate connection of filtering systems between the mains supply and the battery. These filtering systems, which depend on the type of mains supply used, notably comprise induction coils whose volume, with an equal inductance value, is proportional to the square of the current to be filtered.

The patent application FR 2 738 411 proposes an onboard battery recharging system, allowing the battery to be recharged from a single-phase current, and using the coils of the electric motor to contribute to the filtering function. The proposed system requires the neutral point of the motor to be brought out and to be made accessible, for example, by means of connectors. It cannot therefore be adapted to a motor in which the accessibility of the neutral point has not been designed for this purpose. Moreover, this system does not allow recharging using three-phase current.

Patent application EP 0 553 824 proposes an onboard system allowing the battery of the vehicle to be recharged either from a single-phase system or from a three-phase system. In order to limit the volume of the system, the coils of the motor are used to contribute to the filtering of the three-phase current. The currents flowing through the coils during charging are liable to cause the motor to revolve. Even if the motor is held by a specific brake, it remains a source of significant vibrations and noise.

SUMMARY OF THE INVENTION

The object of the invention is to propose an integrated charging device allowing an automobile vehicle battery to be charged from a single-phase mains system or from a three-phase mains system, and, in particular, to be recharged directly from any single-phase mains system. This device must be adaptable, through the addition of a connection housing of reduced dimensions, to any vehicle already equipped with a battery, a motor, and an inverter dedicated to the vehicle traction function.

The subject of the invention is therefore an electric motor assembly, notably for an electrically driven automobile vehicle, comprising a multi-phase electric motor, a battery of accumulators, an inverter suitable for converting the direct current of the battery into multi-phase alternating current adapted to supply the motor, and a connection housing. The connection housing comprises plugs allowing the connection of the motor phases, the battery terminals and at least five connections to the inverter. The housing furthermore comprises a group of contacts allowing it to be connected to a single-phase mains system, and comprises a group of contacts allowing it to be connected to a multi-phase mains system. The housing comprises switches according to the position of which the system comprising the housing, the battery, the inverter and the motor connected solely by its phases alternatively allows the motor to be supplied from the battery, the battery to be recharged directly from a single-phase mains system, and the battery to be recharged from a multi-phase mains system.

Direct recharging from the single-phase mains system is understood to mean recharging which does not require the intermediate connection of a specific filtering interface between the mains system and the electric motor assembly. Conversely, recharging from the multi-phase mains system may require an adapted electric filtering interface.

Advantageously, the housing comprises at least a first switch allowing a first terminal of the battery to be connected alternatively either to the inverter or to a phase of a first coil of the motor.

According to one preferred embodiment, the housing also comprises one or more second switches allowing the interruption or re-establishment simultaneously of at least two connections between the inverter and, each time, a phase of a coil of the motor, including the first coil and a second coil.

Advantageously, the housing comprises a third switch allowing the interruption or re-establishment of a connection between the inverter and a phase of a third coil of the motor which is different from the first two coils.

Thus, by using, for example, the first, second and third switches, the housing allowing the simultaneous connection of the first terminal of the battery to a first coil of the motor, the interruption of the connection between this first coil and the inverter, and the interruption of the connection between the second coil and the inverter, by closing the connection between the third coil and the inverter.

According to a preferred embodiment, each of the contacts with the single-phase mains system is connected to a different plug, allowing the housing to be connected to the inverter, and is furthermore connected, via the second switch(es), to a connection plug, one plug allowing the housing to be connected to a phase of the second coil of the motor, the other plug allowing the housing to be connected to a phase of the first coil of the motor.

According to one variant embodiment, the housing comprises a switch allowing the phase of the second coil of the motor to be connected either to the phase of the first coil of the motor or to the phase of the third coil of the motor.

The housing may comprise at least one inductor connected between one of the contacts with the single-phase mains system and its associated plug for connecting the housing to the inverter.

The inductor may, for example, be of the stator coil type.

The housing may also comprise two coupled inductors, each connected between a contact with the single-phase mains system and its associated plug for connecting the housing to the inverter.

According to a preferred embodiment, the inverter is programmed to function alternatively as an inverter of the motor supply, as a rectifier of a multi-phase current arriving from the motor or arriving from the external multi-phase mains system, and as a single-phase current rectifier followed by a step-down chopper. This programming of the inverter can be obtained, for example, through an adaptation of the program lines or an electronic card of an electronic control unit controlling the inverter.

According to a different aspect of the invention, a connection housing comprises plugs allowing the connection of the phases of a multi-phase electric motor, notably an automobile vehicle motor, the terminals of a battery of accumulators and at least five connections to an inverter suitable for converting the direct current of the battery into multi-phase alternating current adapted to supply the motor. The housing furthermore comprises a group of contacts allowing it to be connected to a single-phase mains system, and comprising a group of contacts allowing it to be connected to a multi-phase mains system. The housing comprises switches according to the position of which the system comprising the housing, the battery, the inverter and the motor connected solely by its phases alternatively allows the motor to be supplied from the battery, the battery to be recharged directly from a single-phase mains system, and the battery to be recharged from a multi-phase mains system.

BRIEF DESCRIPTION OF THE DRAWINGS

Other objects, characteristics and advantages of the invention will become evident from a reading of the detailed description of an embodiment of the invention, provided in a non-limiting manner, and the attached drawings, in which.

DETAILED DESCRIPTION OF EMBODIMENTS
OF THE INVENTION

Figure 1:
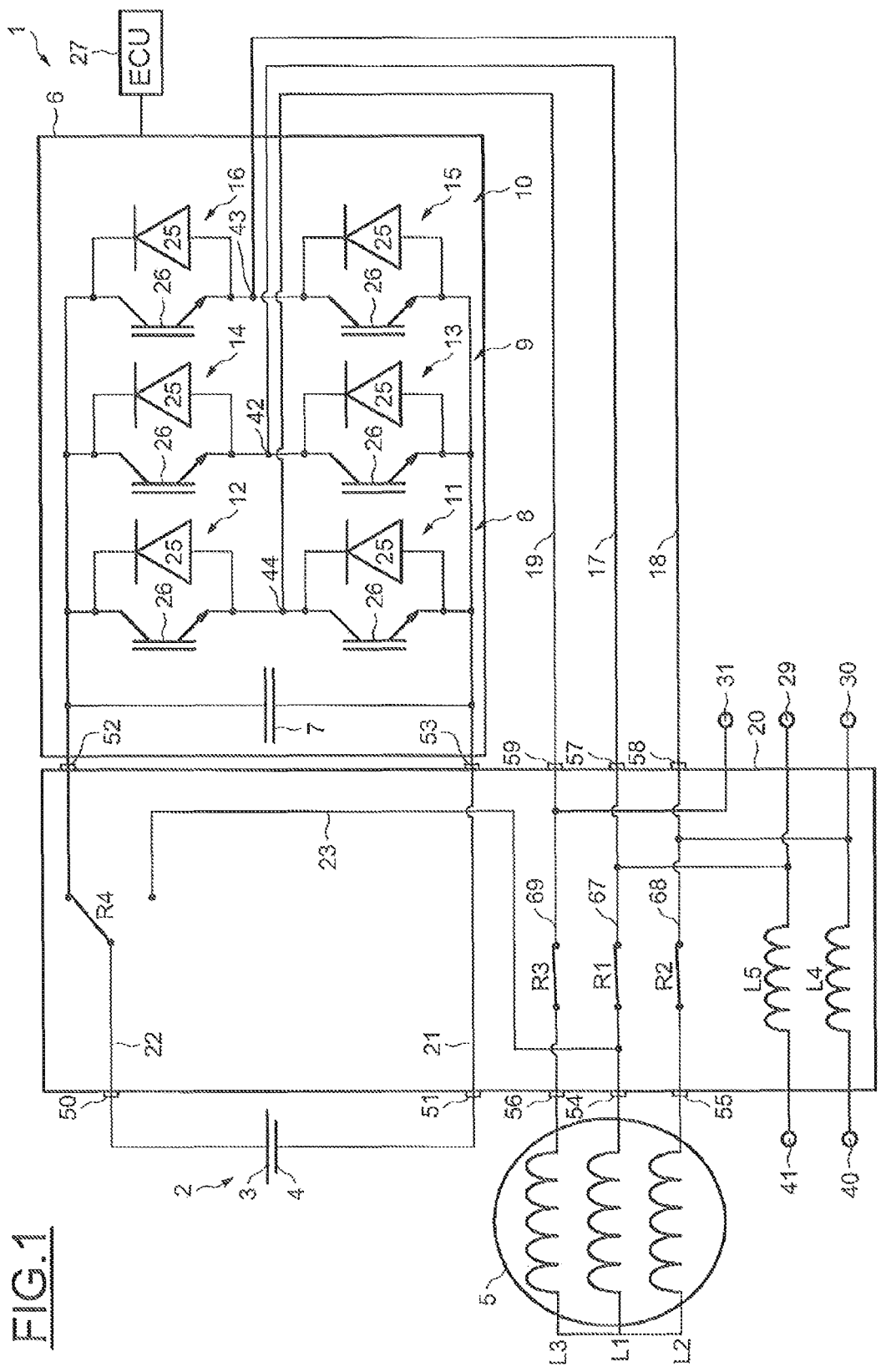
FIG. 1 shows schematically a vehicle electric motor assembly including a connection housing according to the invention.

FIG. 1 shows schematically an electric motor device 1 of an automobile vehicle with an electric traction system. This electric motor device 1 is an integrated device, i.e. installed onboard the vehicle.

The electric motor assembly 1 comprises a battery having a "plus" pole 3 and a "minus" pole 4, a three-phase, alternating-current electric motor 5 comprising three stator coils L1, L2 and L3, an inverter 6 and a connection housing 20. The connection housing 20 comprises ten plugs (male plugs, female plugs or other types of electrical connection) 50, 51, 52, 53, 54, 55, 56, 57, 58, 59 respectively allowing the connection of the terminals 3 and 4 of the battery, two first connections to the inverter 6, the phases of the coils L1, L2, L3 of the motor 5, and three other connections to the inverter 6. The housing 20 comprises four switching devices R1, R2, R3 and R4 and two induction coils L4 and L5. Variant embodiments with a single induction coil can be envisaged. The housing 20 also comprises two external contacts 40 and 41 adapted to be connected to a single-phase mains system, for example to a 32-ampere socket. The housing 20 furthermore comprises three external contacts 29, 30, 31 adapted to be connected to an external three-phase mains system, for example in the form of a plug dedicated to a specific recharging terminal.

The external contacts 29, 30, 31 are connected to plugs 57, 58 and 59 respectively for connecting the housing to the inverter.

The external contacts 40 and 41 are connected to the plugs 58 and 57 respectively, via the coils L4 and L5 respectively.

The plugs 51 and 53 are connected via a connection 21 within the housing 20. The plug 50 is connected via a connection 22 within the housing 20 to the plug 52 connecting to the inverter 6. The connection 22 is interrupted by a two-position switching device R4, which either holds the connection 22 closed, allowing current to flow between the plugs 50 and 52, or opens this connection, isolating the plug 50 from the plug 52, and then connecting the plug 50 to a connection 23 within the housing 20, and which is connected to the plug 54 connecting to the phase of the coil L1 of the motor. In FIG. 1, the switching device R4 is in the position where it closes the connection 22 and opens the connection 23.

The plug 54 connecting to the phase of the coil L1 of the motor is connected via a connection 67 within the housing 20 to the plug 57 connecting to the inverter 6. The switching device R1 is disposed on the path of the connection 67 in such a way as to be able to interrupt or re-establish this connection between the two plugs 54 and 57.

The plug 55 connecting to the phase of the coil L2 of the motor is connected via a connection 68 within the housing 20 to the plug 58 connecting to the inverter 6. The switching device R2 is disposed on the path of the connection 67 in such a way as to be able to interrupt or re-establish this connection between the two plugs 55 and 58.

The plug 56 connecting to the phase of the coil L3 of the motor is connected via a connection 69 within the housing 20 to the plug 59 connecting to the inverter 6. The switching device R3 is disposed on the path of the connection 69 in such a way as to be able to interrupt or re-establish this connection between the two plugs 56 and 59.

In FIG. 1, the switching devices R1, R2, R3 are in the closed position, connecting the coils of the motor and the plugs 57, 58, 59.

The inverter 6 comprises a capacitor 7 of which a first terminal is connected via the plugs 52 and 50 of the switching device R4 and the connection 22 to the terminal 3 of the battery 2. The other terminal of the capacitor 7 is connected via the plugs 53 and 51 and the connection 21 to the terminal 4 of the battery 2. The inverter 6 furthermore comprises a diode bridge circuit comprising three branches 8, 9, 10, coupled in parallel, connected to the terminals of the capacitor 7. Each branch 8, 9, 10 comprises a series arrangement of two assemblies (respectively 11 and 12 for the branch 8, 13 and 14 for the branch 9, 15 and 16 for the branch 10), each assembly including a diode 25 and a transistor 26 connected in parallel. The two diodes of the same branch are connected in the same forward direction, which is the direction going from the "minus" terminal 4 of the battery to the "plus" terminal 3 of the battery. The transistors 26 are controlled by an electronic control unit 27.

Each branch 9, 10, 8 of the inverter is connected via a connection 17, 18, 19 respectively to a plug 57, 58, 59 respectively of the housing 20, therefore via the connections 67, 68, 69 to a phase L1, L2 and L3 respectively of the motor.

More precisely, each connection 17, 18, 19 departs from a triple junction 42, 43, 44 respectively, located between the two series connections of a branch 9, 10, 8 respectively, and arrives at one of the two plugs, 57, 58 and 59 respectively of the housing 20.

In FIG. 1, the switching devices R1, R2 and R3 are in the closed position, i.e. the stator coils L1, L2 and L3 of the motor are actually connected to the corresponding branch 9 or 10 or 8 of the inverter circuit 6. The switching device R4 is in its configuration wherein the connection 22 connects the "plus" terminal of the battery 2 to one of the terminals of the capacitor 7. In this configuration as shown in FIG. 1, the electric motor assembly 1 can operate either in the drive mode of the vehicle or in the kinetic energy recovery mode of the vehicle.

When the electronic control unit 27 receives a positive instruction to couple with the wheels of the vehicle (motor coupling instruction), for example from a man-machine interface (not shown) including, for example, an acceleration pedal, the electronic control unit 27 sends the adapted commands to the different transistors 26 of the inverter 6 so that this inverter 6 transforms a direct current delivered by the battery 2 into a suitable three-phase current arriving at the motor 5 in such a way as to obtain the required drive couple.

When the electronic control unit 27 receives a recuperative braking instruction, for example from the man-machine interface and from the acceleration pedal, it sends adapted commands to the different transistors 26 of the inverter 6 in such a way that this inverter does not permit the arrival of electricity from the battery 2 at the motor 5, and in such a way as to rectify the three-phase current originating from the coils L1, L2 and L3 of the motor, into a direct current conducted in such a way as to recharge the battery 2, i.e. a current entering via the terminal 3 of the battery.

Figure 2:
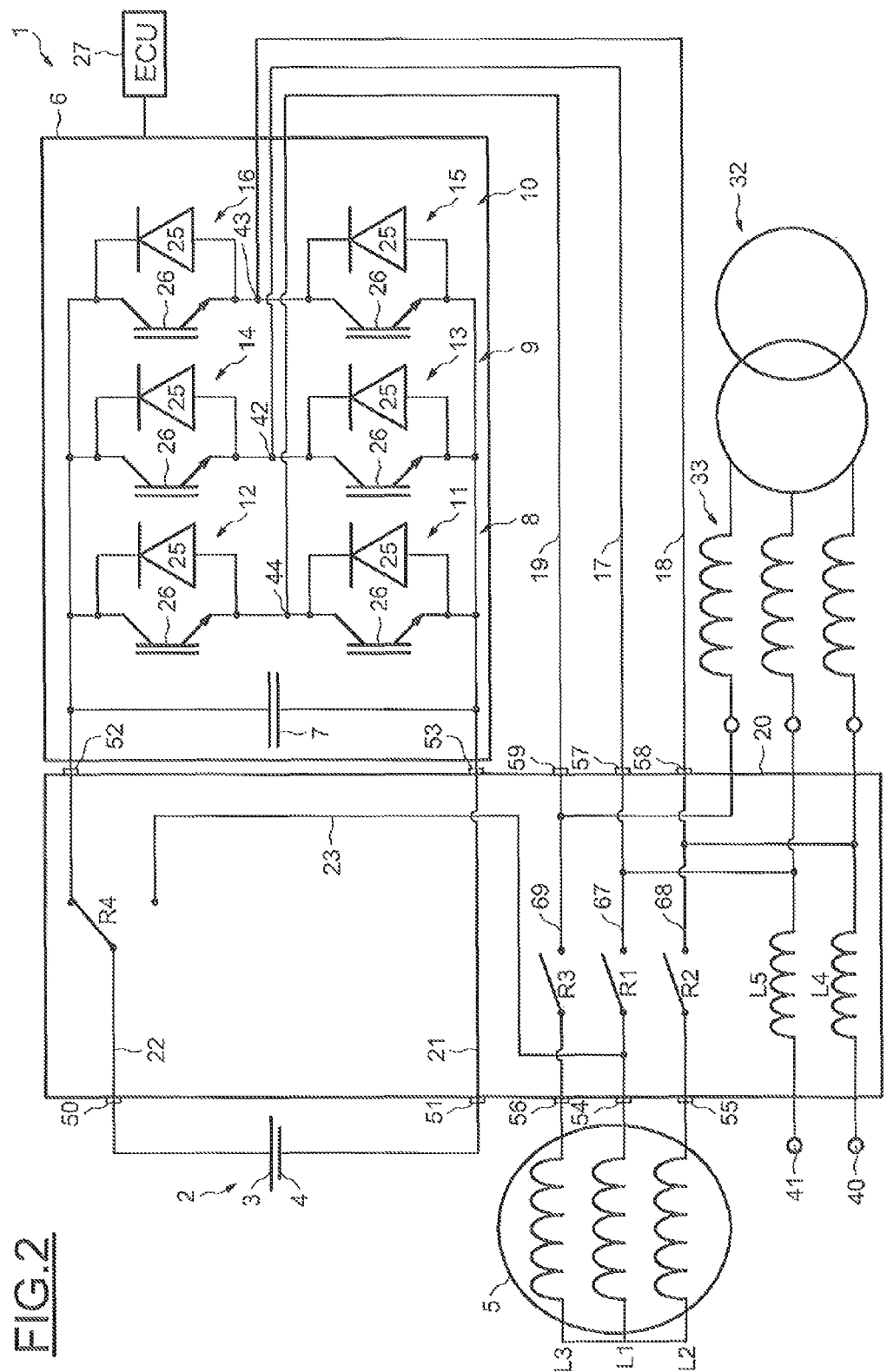
FIG. 2 shows schematically the vehicle electric motor assembly shown in FIG. 1, in a configuration for charging from a three-phase mains system.

FIG. 2 shows the electric motor assembly shown in FIG. 1 in a different configuration, allowing the battery to be recharged from a three-phase mains system. The elements common to FIG. 1 are again shown, the same elements then being denoted by the same references. A three-phase mains system 32, for example a 125-ampere three-phase mains system outside the vehicle, is connected by an electrical filtering device 33 to the three contacts 29, 30, 31 of the connection housing 20. The three switching devices R1, R2 and R3 are open, isolating the motor 5 from the inverter 6. The switching device R4 is in the same position as shown in FIG. 1, the battery 2 thus always being connected to the terminals of the capacitor 7 of the inverter 6.

In the configuration shown in FIG. 2, the electronic control unit 27 detects a three-phase electric current having a predefined signal shape. The electronic control unit can possibly detect, by way of a mechanical detection means, the existence of a branch in the connection group 29, 30, 31. The electronic control unit 27 then sends appropriate commands to the transistors 26 of the inverter 6 in such a way that the latter operates as a controlled current rectifier and delivers to the battery 2 a direct current with an intensity and voltage adapted to the charge level of the battery.

The filtering device 33 filters the current absorbed by the electric motor assembly in such a way that the current satisfies the constraints for connection to the mains system imposed by the operators of the main system, notably in terms of harmonics. This filtering device 33 includes inductors adapted to high currents (for example currents of 100 to 200 amperes) in order to enable accelerated recharges of the battery 2. The volume of an inductor being more or less proportional to the square of the intensity of the current to which it is dedicated, the filtering device 33 may occupy volumes of a plurality of liters. For this reason, in the embodiment described, this filtering device has not been integrated into the vehicle.

Figure 3:
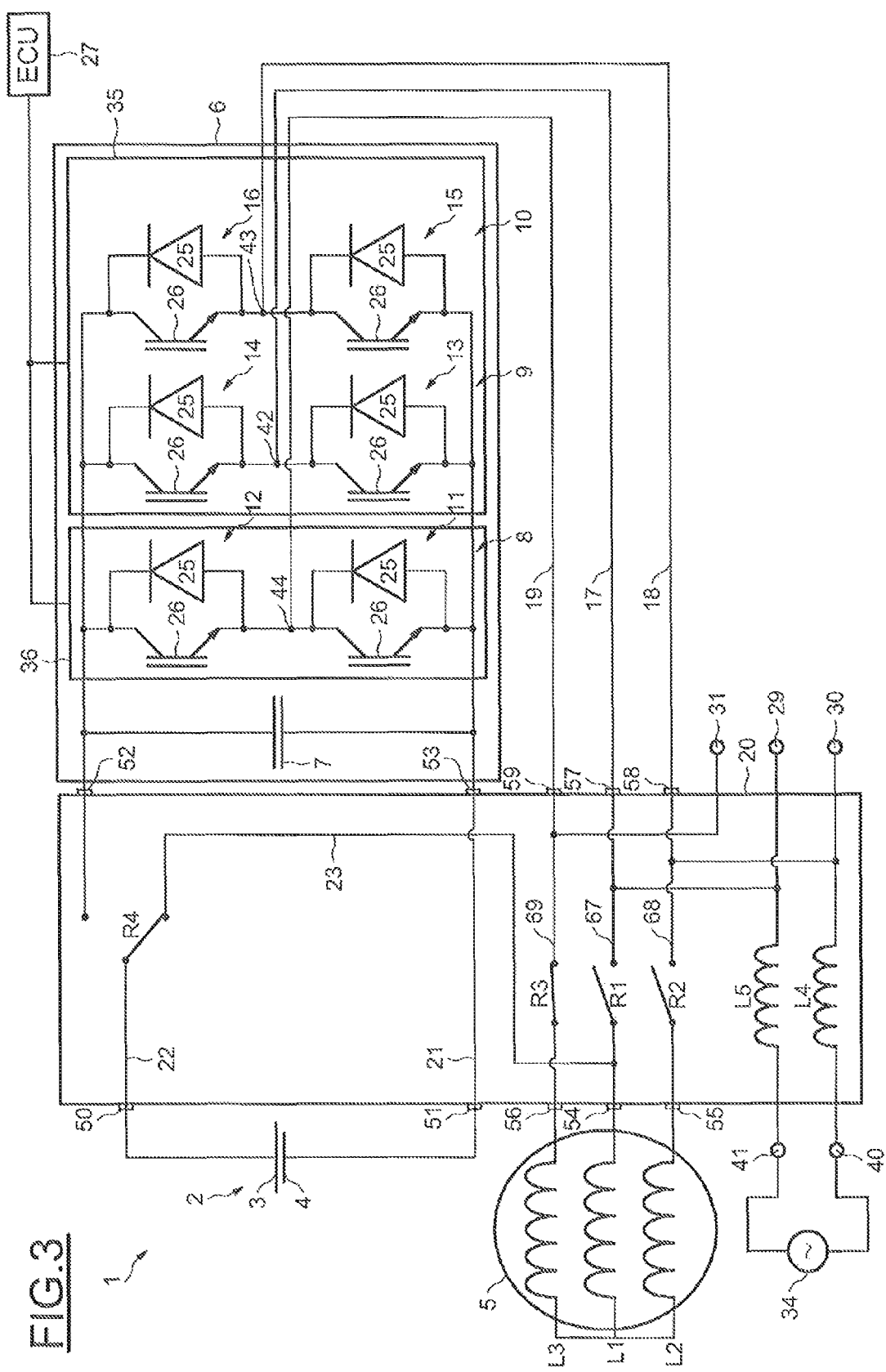
FIG. 3 shows schematically the vehicle electric motor assembly shown in FIG. 1, in a configuration for charging from a single-phase mains system.

FIG. 3 shows the electric motor assembly shown in FIG. 1 in a configuration allowing the battery to be recharged from a single-phase mains system 34. Elements common to FIG. 1 are again shown in FIG. 3, the same elements being denoted by the same references. A first terminal of the single-phase mains system 34 is connected to the contact 40 of the connection housing 20, while the other terminal of the single-phase mains system 34 is connected to the contact 41 of the connection housing 20.

The first terminal is thus connected via the inductor L4 and the connection 18 to the triple junction 43 of the branch 10 of the inverter 6. The other terminal of the mains system is connected via the inductor L5 and the connection 17 to the triple junction 42 of the branch 9 of the inverter 6.

The terminals 29, 30 and 31 of the connection housing 20 are disconnected from any equipment and from any mains system. The switching device R4 is in the position where it connects the "plus" terminal of the battery via the connection 23 to the coil L1 of the motor 5.

The switching device R1 is open, isolating the coil L1 from its connection 17 to the inverter 6.

The switching device R2 is open, isolating the coil L2 of the motor 5 from its connection 18 to the inverter 6.

The switching device R3 is closed, connecting the coil L3 of the motor via its connection 19 to the triple junction 44 of the branch 8 of the inverter 6.

In this configuration, the electronic control unit 27 detects, for example, a signal with a predefined voltage, amplitude and shape between the contacts 40 and 41 of the housing 20. The electronic control unit 27 can also detect, by means of an adapted device, the physical presence of a connection in these contacts 40 and 41. The electronic control unit 27 then sends the adapted commands to the different transistors 26, in such a way as to make the branches 9 and 10 of the inverter 6 operate as a synchronous current rectifier 35 allowing the capacitor 7 to be charged. The electronic control unit 27 also sends adapted signals to the transistors 26 of the branch 8 of the inverter, in such a way as to make this branch 8, notably the upper assembly 12, operate as a step-down chopper 36. This step-down chopper allows the capacitor 7 to be discharged via the connection 19, then via the coils L3 then L1 of the motor, connected in series, to the "plus" terminal 3 of the battery 2, in order to recharge the latter. In other words, the single-phase current arriving from the mains system 34 is filtered by the inductors L4 and L5 of the connection housing 20, in such a way as to satisfy the constraints for connection to the mains system, flows via the connections 17 and 18 to the synchronous rectifier 35 and charges the capacitor 7. The step-down chopper 36 then discharges the capacitor 7 via the coils L1 and L3 of the motor, to the supply terminal, here the "plus" terminal 3 of the battery.

In the configuration shown in FIG. 3, the electric motor assembly 1 fitted with the connection housing 20 therefore allows the battery 2 to be recharged from any single-phase mains system 34 without having to make use of an additional housing outside the vehicle to filter the current obtained from the mains system.

Figure 4:
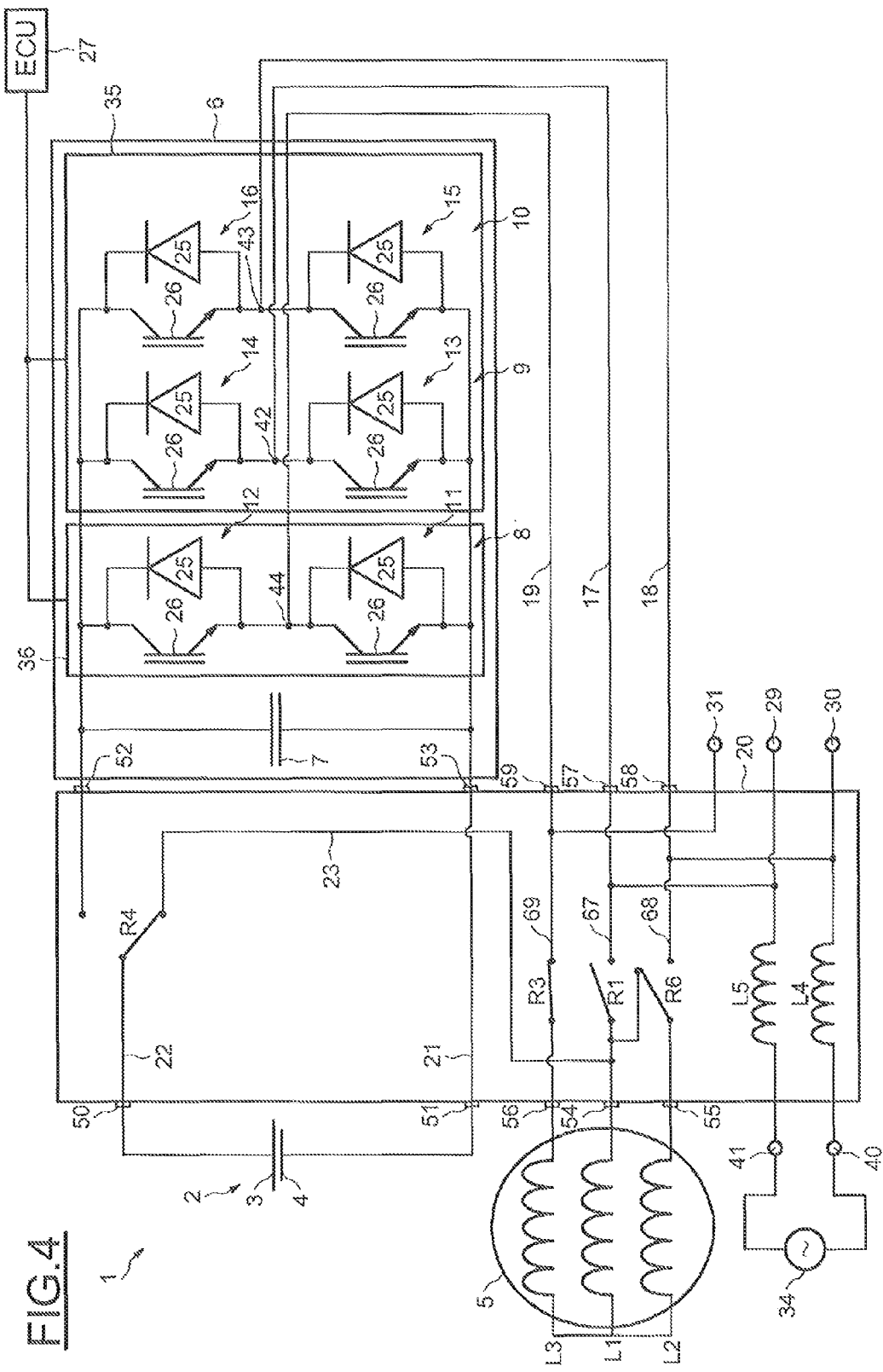
FIG. 4 shows schematically a variant embodiment of an electric motor assembly according to the invention, in a configuration for charging from a single-phase mains system.

FIG. 4 shows a variant embodiment of an electric motor assembly according to the invention, again in a configuration for charging from a single-phase mains system. Elements common to the preceding figures are again shown in FIG. 4, the same elements being denoted by the same references. The switching device R2 shown in FIG. 3 is replaced with a switching device R6 which, at the same time as it interrupts the connection 68, allows the phases of the coils L1 and L2 to be interconnected.

The current originating from the step-down chopper 36 via the connection 19 therefore crosses the coil L3 of the motor, then the coils L1 and L2 of the motor connected in series, before arriving via the connection 23 at the "plus" terminal 3 of the battery 2.

This variant embodiment avoids the risk of overvoltage induced in the coil L2 and in the switch R2, which could damage R2 or require voltage over-dimensioning on its part. Moreover, the inductors of the coils L1, L2 and L3 are variable according to the position in which the motor 5 is stopped. By connecting the coils L1 and L2 in parallel, the effect of these variations is averaged.

Figure 5:
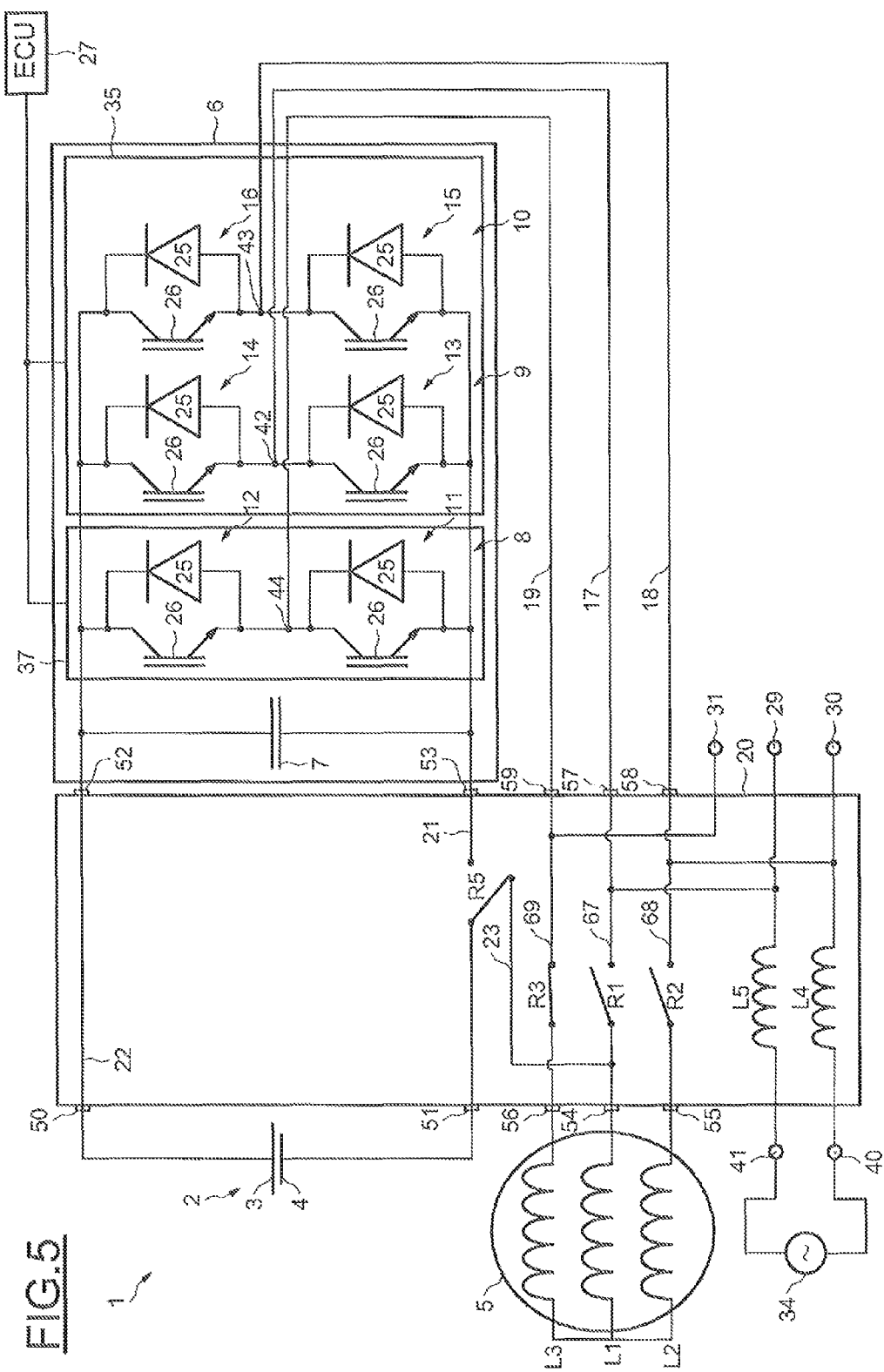
FIG. 5 shows schematically a different variant embodiment of an electric motor assembly according to the invention, in a configuration for charging from a single-phase mains system.

FIG. 5 shows a different variant embodiment of an electric motor assembly according to the invention, again in a configuration for charging from a single-phase mains system. Elements common to the preceding figures are again shown in FIG. 5, the same elements then being denoted by the same references. In the connection housing 20 shown in FIG. 5, the switching device R4 has been removed, the connection 22 connecting in a permanent manner the "plus" terminal 3 of the battery 2 to one of the terminals of the capacitor 7.

On the other hand, a switching device R5 has been inserted into the connection 21 connecting the "minus" terminal of the battery 2 and the other terminal of the capacitor 7. The switching device R5 allows the plug 53 to be isolated from the connection 21 and from the plug 51, or the connection 21 between the plugs 51 and 53 to be re-established. When the connection 21 is interrupted, the switching device R5 connects the plug 51 and the plug 54 via the connection 23. In this configuration, as shown in FIG. 5, the "minus" terminal 4 of the battery is connected to the phase of the coil L1 of the motor. The switching devices R1, R2 and R3 are in the same configuration as shown in FIG. 3. The recharging of the battery 2 is carried out according to the same principle as for the electric motor assembly 1 shown in FIG. 3: the current absorbed from the single-phase mains system 34 via the connections 17 and 18 is rectified by the synchronous rectifier 35 in order to charge the capacitor 7. The programming of the electronic control unit 27 is adapted to make the branch 8 of the inverter 6 operate as a step-down chopper 37, this time by authorizing the arrival of the current to the step-down chopper 37 via the connection 19, from the "minus" terminal 4 of the battery.

The subject of the invention is not limited to the example embodiments described and may be the subject of numerous variants. The invention could, for example, be generally applied to a motor having more than three phases or to a multi-phase mains supply system also having more than three phases. The single-phase mains system, instead of being an alternating current mains supply system, could be a direct current mains supply system. The two filtering coils L4 and L5 connected in series with the contacts 40 and 41 to the single-phase mains supply system 34 could be replaced with a single filtering coil connected in series either with the contact 40 or with the contact 41. This coil will then advantageously be a stator coil, in such a way as to have a sufficient inductance in a reduced volume. Variant embodiments can also be envisaged in which the two coils L4 and L5 are both stator coils, these stator coils being separated, or the two coils L4 and L5 being coupled, i.e. wound around the same stator.

Advantageously, the electronic control unit 27 is connected to sensors enabling the measurement of the voltage across the terminals of the battery 2, the voltage across the terminals of the capacitor 7, the voltage between the contacts 40 and 41 of the housing, and the voltage between at least two of the contacts 29, 30 and 31. The electronic control unit 27 may also be connected to means for measuring the current circulating in the connections 17, 18 and 19, and/or the currents circulating in each of the coils L1, L2 and L3 of the motor.

On the basis of the voltages and currents thus measured, the electronic control unit 27 sends the adapted commands to the different transistors 26 of the inverter 6, in such a way as to make this inverter operate either as an inverter or rectifier of three-phase current or as a rectifier of single-phase current. The switching devices R1, R2, R3, R4 or, according to the variants, R5, R6, may be actuated from an electronic control unit 27 or may be actuated manually by the user, for example by means of a first switch allowing the switching devices R1 and R2 to be opened or closed simultaneously, and two other switches, one switch allowing R3 to be actuated and the other switch allowing R4 or R5 to be actuated.

The charging device according to the invention can be connected either directly to any single-phase mains system, for example a domestic mains system, or to a three-phase mains system equipped with a filtering system, for example a fast recharging terminal in a vehicle rental garage or at a motorway restaurant/service station. The device can be simply adapted to an existing electric traction assembly by inserting the connection housing 20 instead of and in place of the existing connection housing, and by modifying, in the electronic control unit 27, the programming of the inverter 6. The device requires the addition of only a limited number of filtering components, as it makes use of the coils of the motor for single-phase recharging. The device allows a large number of potential recharging points, including fast recharging points, to be accessed.

The invention claimed is:
1. An electric motor assembly comprising:
a multi-phase electric motor including stator coils permanently connected to a neutral point;
a battery of accumulators;
an inverter configured to convert direct current of the battery into multi-phase alternating current adapted to supply the motor; and
a connection housing comprising plugs allowing connection of the motor phases to the housing, the battery phases, and at least five connections to the inverter,
the housing further comprising a group of contacts allowing the housing to be connected to a single-phase mains system, and comprising a group of contacts allowing the housing to be connected to a multi-phase mains system,
the housing further comprising a group of switches according to a position of which the system comprising the housing, the battery, the inverter, and the motor con- nected solely by its phases, alternatively allows the motor to be supplied from the battery, the battery to be recharged directly from a single-phase mains system, and the battery to be recharged from a multi-phase mains system.

2. The electric motor assembly as claimed in claim 1, the housing further comprising at least a first switch allowing a first terminal of the battery to be connected alternatively either to the inverter or to a phase of a first coil of the motor.

3. The electric motor assembly as claimed in claim 1, the housing further comprising one or more second switches allowing interruption or re-establishment simultaneously of at least two connections between the inverter and, each time, a phase of a coil of the motor, including a first coil and a second coil.

4. The electric motor assembly as claimed in claim 3, the housing further comprising a third switch allowing interruption or re-establishment of a connection between the inverter and a phase of a third coil of the motor, which is different from the first and second coils.

5. The electric motor assembly as claimed in claim 1, the housing allowing simultaneous connection of a first terminal of the battery to a first coil of the motor, interruption of connection between the first coil and the inverter, interruption of connection between a second coil and the inverter, by conversely closing a connection between a third coil and the inverter.

6. The electric motor assembly as claimed in claim 1, in which each of the contacts with the single-phase mains system is connected to a different plug allowing the housing to be connected to the inverter, and is further connected via the switches to a connection plug, one plug allowing the housing to be connected to a phase of a second coil of the motor, the other plug allowing the housing to be connected to a phase of a first coil of the motor.

7. The electric motor assembly as claimed in claim 1, the housing further comprising a switch allowing a phase of a second coil of the motor to be connected either to a phase of a first coil of the motor or to a phase of a third coil of the motor.

8. The electric motor assembly as claimed in claim 1, the housing further comprising at least one inductor connected between one of the contacts with the single-phase mains system and its associated plug for connecting the housing to the inverter.

9. The electric motor assembly as claimed in claim 8, in which the inductor is of stator coil type.

10. The electric motor assembly as claimed in claim 8, the housing comprising two coupled inductors each connected between a contact with the single-phase mains system and its associated plug for connecting the housing to the inverter.

11. The electric motor assembly as claimed in claim 1, in which the inverter is programmed to function alternatively as an inverter of the motor supply, as a rectifier of a multi-phase current arriving from the motor or arriving from the external multi-phase mains system, and as a rectifier of single-phase current followed by a step-down chopper.

12. A connection housing comprising:
plugs allowing connection of phases of a multi-phase electric motor of a battery of accumulators and at least five connections to an inverter configured to convert direct-current of the battery into multi-phase alternating current adapted to supply the motor,
the housing comprising a group of contacts allowing the housing to be connected to a single phase mains system, and comprising a group of contacts allowing the housing to be connected to a multi-phase mains system,
the housing further comprising switches according to a position of which the system comprising the housing, the battery, the inverter, and the motor connected solely by its phases, alternatively allows the motor to be supplied from the battery, the battery to be recharged directly from a single-phase mains system, and the battery to be recharged from the multi-phase mains system.

\* \* \* \* \*